US007440556B2

(12) United States Patent
Bear et al.

(10) Patent No.: US 7,440,556 B2
(45) Date of Patent: Oct. 21, 2008

(54) SYSTEM AND METHOD FOR USING TELEPHONY CONTROLS ON A PERSONAL COMPUTER

(75) Inventors: Eric Gould Bear, Bellevue, WA (US); Chad Magendanz, Issaquah, WA (US); Aditha May Adams, Seattle, WA (US); Carl Ledbetter, Mercer Island, WA (US); Steve Kaneko, Medina, WA (US); Dale C. Crosier, Kirkland, WA (US); Robert S. Plank, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 93 days.

(21) Appl. No.: 10/677,084

(22) Filed: Sep. 30, 2003

(65) Prior Publication Data

US 2005/0069101 A1    Mar. 31, 2005

(51) Int. Cl.
*H04M 11/00*    (2006.01)
(52) U.S. Cl. ................................. 379/90.01; 379/93.07
(58) Field of Classification Search ............ 379/110.01, 379/90.01, 93.17, 93.19, 93.28, 377, 419, 379/433.06, 433.07, 93.07
See application file for complete search history.

(56) References Cited

U.S. PATENT DOCUMENTS

| 4,860,342 | A | * | 8/1989 | Danner ..................... 379/93.28 |
| 5,159,445 | A | | 10/1992 | Gitlin |
| 5,412,417 | A | | 5/1995 | Tozuka |
| 5,487,181 | A | | 1/1996 | Dailey |
| 5,519,722 | A | | 5/1996 | Akman |
| 5,533,115 | A | | 7/1996 | Hollenbach |
| 5,546,538 | A | | 8/1996 | Cobbley |
| 5,568,540 | A | | 10/1996 | Grecko ..................... 379/88.25 |
| 5,657,414 | A | | 8/1997 | Lett |
| 5,675,374 | A | | 10/1997 | Kohda ........................ 348/14.1 |
| 5,675,810 | A | | 10/1997 | Sellers |
| 5,727,047 | A | * | 3/1998 | Bentley et al. ........... 379/93.05 |
| 5,768,164 | A | | 6/1998 | Hollon |

(Continued)

FOREIGN PATENT DOCUMENTS

EP    0772327 A2    5/1997

(Continued)

OTHER PUBLICATIONS

Anonymous, International Search Report in Corresponding EP Application No. EP 04 00 9868.

(Continued)

*Primary Examiner*—Stella L Woo
(74) *Attorney, Agent, or Firm*—Workman Nydegger

(57) ABSTRACT

A system and method including telephony controls for handling telephony applications on a personal computer with integrated telephony capabilities is provided. The telephony controls include a hook switch, a talk button, a speakerphone button, a mute button, a flash button, a conference button, a microphone button, and a voice mail button. There may also be other telephony control buttons such as an optional record button in close proximity to the telephony controls for use in responding to voice mail. An indicator light may be located adjacent to or integrated into each telecommunication control button. The system and method allow a number of user interaction scenarios with respect to real-time communications, including handling an incoming telephone call, making a telephone call, and handling voice mail.

68 Claims, 10 Drawing Sheets

U.S. PATENT DOCUMENTS

| | | | |
|---|---|---|---|
| 5,802,305 A | 9/1998 | McKaughan | |
| 5,959,622 A | 9/1999 | Greer | |
| 5,999,613 A | 12/1999 | Nabkel et al. | |
| 6,006,285 A | 12/1999 | Jacobs | |
| 6,018,571 A * | 1/2000 | Langlois et al. | 379/93.17 |
| 6,052,442 A | 4/2000 | Cooper et al. | 379/88.19 |
| 6,101,610 A | 8/2000 | Beebe | |
| 6,144,363 A | 11/2000 | Alloul | 345/618 |
| 6,144,644 A | 11/2000 | Bajzath et al. | 370/259 |
| 6,172,703 B1 | 1/2001 | Lee | 348/14.08 |
| 6,208,373 B1 | 3/2001 | Fong et al. | 348/14.16 |
| 6,215,420 B1 | 4/2001 | Harrison et al. | 341/22 |
| 6,237,846 B1 | 5/2001 | Lowell | |
| 6,240,168 B1 * | 5/2001 | Stanford et al. | 379/110.01 |
| 6,266,714 B1 | 7/2001 | Jacobs | |
| 6,279,056 B1 | 8/2001 | Jacobs | |
| 6,282,435 B1 | 8/2001 | Wagner et al. | 455/566 |
| 6,346,934 B1 | 2/2002 | Wugofski | 345/158 |
| 6,362,440 B1 | 3/2002 | Karidis | |
| 6,366,653 B1 * | 4/2002 | Yeh et al. | 379/93.05 |
| 6,380,968 B1 | 4/2002 | Alexander | |
| 6,417,849 B2 | 7/2002 | Lefebvre | |
| 6,438,585 B2 | 8/2002 | Mousseau | |
| 6,453,027 B1 | 9/2002 | Kang | |
| 6,483,905 B1 | 11/2002 | Kikinis | 379/93.24 |
| 6,507,356 B1 | 1/2003 | Jackel et al. | 348/14.06 |
| 6,513,128 B1 | 1/2003 | Wang | |
| 6,518,957 B1 * | 2/2003 | Lehtinen et al. | 379/433.06 |
| 6,519,335 B1 | 2/2003 | Bushnell | |
| 6,546,262 B1 * | 4/2003 | Freadman | 455/557 |
| 6,603,855 B1 * | 8/2003 | Cannon et al. | 379/377 |
| 6,621,893 B2 * | 9/2003 | Elzur | 379/93.05 |
| 6,628,194 B1 | 9/2003 | Hellebust | 340/7.5 |
| 6,628,267 B2 | 9/2003 | Karidis | |
| 6,658,095 B1 | 12/2003 | Yoakum | |
| 6,671,356 B2 | 12/2003 | Lewis | 379/88.13 |
| 6,671,743 B1 | 12/2003 | Verity | 709/321 |
| 6,680,845 B2 | 1/2004 | Agata | |
| 6,691,233 B1 | 2/2004 | Gannage | |
| 6,700,954 B1 * | 3/2004 | Pflaum | 379/93.05 |
| 6,718,183 B1 | 4/2004 | Blust | |
| 6,731,316 B2 | 5/2004 | Herigstad et al. | 715/864 |
| 6,741,232 B1 | 5/2004 | Siedlikowski | 345/156 |
| 6,757,372 B1 | 6/2004 | Dunlap et al. | 379/142 |
| 6,806,867 B1 | 10/2004 | Arruda | |
| 6,819,961 B2 | 11/2004 | Jacobs | |
| 6,831,657 B2 | 12/2004 | Tsutsumi et al. | 345/589 |
| 6,882,326 B2 | 4/2005 | Hirayama | 345/1.1 |
| 6,888,562 B2 | 5/2005 | Rambo et al. | 348/14.16 |
| 6,892,074 B2 | 5/2005 | Tarkiainen | 455/466 |
| 6,897,851 B2 | 5/2005 | Carini | |
| 6,902,332 B2 | 6/2005 | McLoone | 400/472 |
| 6,912,283 B2 | 6/2005 | Meyerson et al. | 379/428.04 |
| 6,937,950 B2 | 8/2005 | Cragun | |
| 6,938,174 B2 | 8/2005 | LeKuch | |
| 6,970,556 B2 | 11/2005 | Wall et al. | 379/355.01 |
| 6,973,167 B2 | 12/2005 | Kikinis | 379/67.1 |
| 6,976,216 B1 | 12/2005 | Peskin et al. | 715/716 |
| 6,980,641 B1 | 12/2005 | Stanford et al. | 379/387 |
| 6,996,445 B1 | 2/2006 | Kamijo | 700/94 |
| 7,036,110 B2 | 4/2006 | Jeyaraman | |
| 7,096,391 B2 | 8/2006 | Johnson | |
| 7,123,370 B2 | 10/2006 | Watanabe | |
| 7,221,331 B2 | 5/2007 | Bear | |
| 7,231,229 B1 | 6/2007 | Hawkins | |
| 7,243,130 B2 | 7/2007 | Horvitz | |
| 7,272,660 B1 | 9/2007 | Powers | |
| 7,302,637 B1 | 11/2007 | Maguire | |
| 2001/0040551 A1 | 11/2001 | Yates et al. | 345/156 |
| 2002/0015020 A1 | 2/2002 | Mobin | 345/156 |
| 2002/0080967 A1 | 6/2002 | Abdo | |
| 2002/0087225 A1 | 7/2002 | Howard | |
| 2002/0131072 A1 | 9/2002 | Jackson | |
| 2002/0167458 A1 | 11/2002 | Baudisch | |
| 2002/0167460 A1 | 11/2002 | Baudisch | |
| 2003/0021290 A1 | 1/2003 | Jones | 370/466 |
| 2003/0025674 A1 | 2/2003 | Watanabe | |
| 2003/0037180 A1 | 2/2003 | Madineni et al. | 709/321 |
| 2003/0069689 A1 | 4/2003 | Ihara | |
| 2003/0074590 A1 | 4/2003 | Fogle | |
| 2003/0112325 A1 | 6/2003 | Boyden et al. | 348/14.16 |
| 2003/0122874 A1 | 7/2003 | Dieberger | |
| 2003/0131148 A1 | 7/2003 | Kelley et al. | 717/101 |
| 2003/0146903 A1 | 8/2003 | Yi | |
| 2003/0188041 A1 | 10/2003 | Fillmore | |
| 2003/0197685 A1 | 10/2003 | Yi | |
| 2003/0227471 A1 | 12/2003 | Eglit | |
| 2004/0114032 A1 | 6/2004 | Kakii | 348/14.08 |
| 2004/0135819 A1 | 7/2004 | Maa | |
| 2004/0141012 A1 | 7/2004 | Tootill | 345/827 |
| 2004/0155956 A1 | 8/2004 | Libbey | 348/14.16 |
| 2004/0177361 A1 | 9/2004 | Bernhard et al. | 719/321 |
| 2004/0222977 A1 | 11/2004 | Bear | 340/815.4 |
| 2004/0222978 A1 | 11/2004 | Bear | 345/172 |
| 2004/0223058 A1 | 11/2004 | Richter | |
| 2004/0223061 A1 | 11/2004 | Bear | 348/207.1 |
| 2004/0223599 A1 | 11/2004 | Bear | 379/215.01 |
| 2004/0225502 A1 | 11/2004 | Bear | 704/270 |
| 2004/0225892 A1 | 11/2004 | Bear | 726/2 |
| 2004/0225901 A1 * | 11/2004 | Bear et al. | 713/300 |
| 2004/0240167 A1 | 12/2004 | Ledbetter et al. | 361/683 |
| 2004/0240650 A1 * | 12/2004 | Bear et al. | 379/142.01 |
| 2005/0068423 A1 | 3/2005 | Bear | 345/156 |
| 2005/0069101 A1 | 3/2005 | Bear | 379/90.01 |
| 2005/0071437 A1 | 3/2005 | Bear | 713/1 |
| 2005/0071626 A1 | 3/2005 | Bear | 713/1 |
| 2005/0182822 A1 | 8/2005 | Daniel | |
| 2005/0186942 A1 | 8/2005 | Griffin | |
| 2005/0193396 A1 | 9/2005 | Stafford-Fraser | |
| 2006/0007051 A1 | 1/2006 | Bear | 345/1.1 |
| 2006/0048062 A1 | 3/2006 | Adamson | |
| 2006/0061516 A1 | 3/2006 | Campbell | |
| 2006/0095525 A1 | 5/2006 | Mousseau | |
| 2006/0130075 A1 | 6/2006 | Rhoten | 719/328 |
| 2006/0164324 A1 | 7/2006 | Polivy | 709/206 |
| 2006/0284787 A1 | 12/2006 | Bear | |

FOREIGN PATENT DOCUMENTS

| | | | |
|---|---|---|---|
| EP | 0777394 A1 | 6/1997 | |
| EP | 000816990 | 1/1998 | |
| EP | 0838934 A1 | 4/1998 | |
| EP | 0772327 A3 | 2/1999 | |
| WO | WO 9602049 A1 * | 1/1996 | |
| WO | WO9602049 A1 | 1/1996 | |

OTHER PUBLICATIONS

U.S. Appl. No. 11/509,437, filed Aug. 23, 2006, Bear.
U.S. Appl. No. 11/559,821, filed Nov. 14, 2006, Bear.
U.S. Appl. No. 11/685,014, filed Mar. 12, 2007, Bear.
Anonymous, International Search Report in Corresponding EP Application No. EP 04 00 9868.
U.S. Appl. No. 11/837,302, filed Aug. 10, 2007, Bear.
Oxford On-line Dictionary, http://dictionary.oed.com/entrance.dtl, Oxford University Press 2007, on the definition of the word "physical" under III/7b.
Office Action dated Aug. 8, 2007 cited in related U.S. Appl. No. 10/996, 371 (Copy Attached).
Office Action dated Jul. 27, 2007 cited in related U.S. Appl. No. 10/996, 557 (Copy Attached).
Office Action dated Aug. 8, 2007 cited in related U.S. Appl. No. 10/430,369 (Copy Attached).
Office Action dated Jul. 6, 2007 cited in related U.S. Appl. No. 10/429,943 (Copy Attached).

Notice of Allowance dated Sep. 7, 2007 cited in related U.S. Appl. No. 10/429,931 (Copy Attached).

Office Action dated Sep. 24, 2007 cited in related U.S. Appl. No. 10/429,933 (Copy Attached).

Office Action dated Feb. 15, 2008 cited in related U.S. Appl. No. 10/429,933 (Copy Attached).

Notice of Allowance dated Jan. 30, 2008 cited in related U.S. Appl. No. 10/429,931 (Copy Attached).

Office Action dated Mar. 21, 2008 cited in related U.S. Appl. No. 10/966,557 (Copy Attached).

Office Action dated Feb. 28, 2008 cited in related U.S. Appl. No. 10/966,371 (Copy Attached).

Office Action dated Sep. 28, 2007 cited in related U.S. Appl. No. 10/429,943 (Copy Attached).

Office Action dated Mar. 26, 2008 cited in related U.S. Appl. No. 10/429,943 (Copy Attached).

Office Action dated Mar. 18, 2008 cited in related U.S. Appl. No. 10/677,118 (Copy Attached).

Office Action dated Oct. 15, 2007 cited in related U.S. Appl. No. 10/429,903 (Copy Attached).

Notice of Allowance dated Apr. 2, 2008 cited in related U.S. Appl. No. 10/429,903 (Copy Attached).

Notice of Allowance dated Apr. 23, 2008 cited in related U.S. Appl. No. 10/430,369 (Copy Attached).

* cited by examiner

SYSTEM AND METHOD FOR USING TELEPHONY CONTROLS ON A PERSONAL COMPUTER

CROSS-REFERENCE TO RELATED APPLICATIONS

The present invention is related to the following copending U.S. patent applications filed May 5, 2003, assigned to the assignee of the present invention, and hereby incorporated by reference in their entireties:

"System and method for Auxiliary Display of Information for a Computing Device," Ser. No. 10/429,932;

"Real-Time Communications Architecture and Methods for use with a Personal Computer System," Ser. No. 10/429,905;

"Record Button on a Computer System," Ser. No. 10/429,904;

"System and method for Auxiliary Processing Of Information for a Computing Device," 10/429,930;

"System and Method for Activating a Computer System;" Ser. No. 10/430,369;

"Computer Camera System and Method for Reducing Parallax," Ser. No. 10/429,943;

"Control and Communications Panel for a Computer System," Ser. No. 10/429,933; and "Notification Lights, Locations and Rules for a Computer System," Ser. No. 10/429,931.

FIELD OF THE INVENTION

The invention relates generally to computer systems and communications, and more particularly to an improved system and method for using telephony controls on a personal computer system.

BACKGROUND OF THE INVENTION

The role of contemporary computers continues to evolve as a tool used for communications and media applications. Personal computers offer many new and exciting media applications for personal entertainment such as live television, personal video recording, playing or recording digital music, displaying or creating digital photographs, and playing movies recorded on a DVD. With the introduction of Voice-over-IP (VoIP) and other IP telephony applications, computers also may be used for handling phone calls and voice mail, in addition to handling media applications and customary communication applications such as email, instant messaging, fax communications, and so forth.

A personal computer with integrated telephony can enhance voice and video communication in ways that empower the user while increasing user productivity and enjoyment. For example, a personal computer may be designed that is capable of accepting incoming calls of various kinds such as analog Public Switched Telephone Network (PSTN), private branch exchange (PBX), cellular telephony, VoIP, and/or cellular telephony. Application programs may use VoIP telephony, instant messaging and videoconferencing by integrating the use of microphone, speakers and camera.

What is needed is a simplified system and method for a user to interact with these various communications and media applications, in a consistent way across these communication modalities. The system and method should operate in what is perceived to be an intelligent manner, and be fairly comprehensive in handling communications, as well as flexible and extensible to handle many user scenarios and usage patterns. At the same time, such a system and method should be straightforward for users to activate and also interact with in an intuitive way.

SUMMARY OF THE INVENTION

Briefly, the present invention provides a system and method including telephony controls for handling telephony applications on a personal computer with integrated telephony capabilities. Such a personal computer may be connected to telephone equipment for accepting incoming calls of various kinds such as analog Public Switched Telephone Network (PSTN), private branch exchange (PBX), cellular telephony or VoIP. To this end, the computer is generally arranged as a central communications point for multiple communications-related devices. Accordingly, the present invention provides an enhanced user interface with telephony controls for such a computer so that users may activate and interact with telecommunications applications such as handling phone calls and voice mail.

The telephony controls may include a hook switch, a talk button, a speakerphone button, a mute button, a flash button, a conference button, a microphone button, and a voice mail button. There may also be other telephony control buttons, such as an optional record button in close proximity to the telephony controls for use in responding to voice mail. Because the state of an individual telephony control button may not be readily apparent to a user, an indicator light such as an LED may be located adjacent to or integrated into each telecommunication control button as appropriate. Additionally, there may be a single hook indicator light alternatively used.

The hook switch operates in a number of ways, including using it to terminate a call, lifting it to make a receiver active and pick up waiting line, as a flash button to switch lines or terminate a call if no lines are waiting. The hook state may be toggled between "off hook" and "on hook" either by lifting the handset from the cradle with a mechanically integrated hook switch, by pressing the talk button, by pressing the speakerphone button, or in another way such as via graphical user interface.

The system and method allow a number of user interaction scenarios with respect to real-time communications, including handling an incoming telephone call and making a telephone call. To make a telephone call, the user lifts the handset or presses the talk button or presses the speakerphone button, and then dials a number. Alternatively, the user may select a contact using a graphical user interface or employ voice dialing. While on a call, a user may switch the active receiver to a speakerphone or other receiver such as a handset or headset. The user may decide to switch the system audio input device from the handset or headset to a computer microphone. A user may also perform tasks such as switching lines using the flash button to answer a waiting call or toggling a call hold state by actuating the hold button. The user can also perform other communications-related tasks, including conference calling and checking voice mail. Whenever a new voice mail message arrives, an indicator light may blink to notify the user, whereby the user can press the voice mail button to access voice mail.

In general, the system and method of the present invention is relatively comprehensive as well as flexible and extensible to handle virtually any telephony functionality, and additional telephony controls may be easily added as needed. The system and method may also be customizable to an extent. Other advantages will become apparent from the following detailed description when taken in conjunction with the drawings, in which:

DETAILED DESCRIPTION

Exemplary Operating Environment

Figure 1:
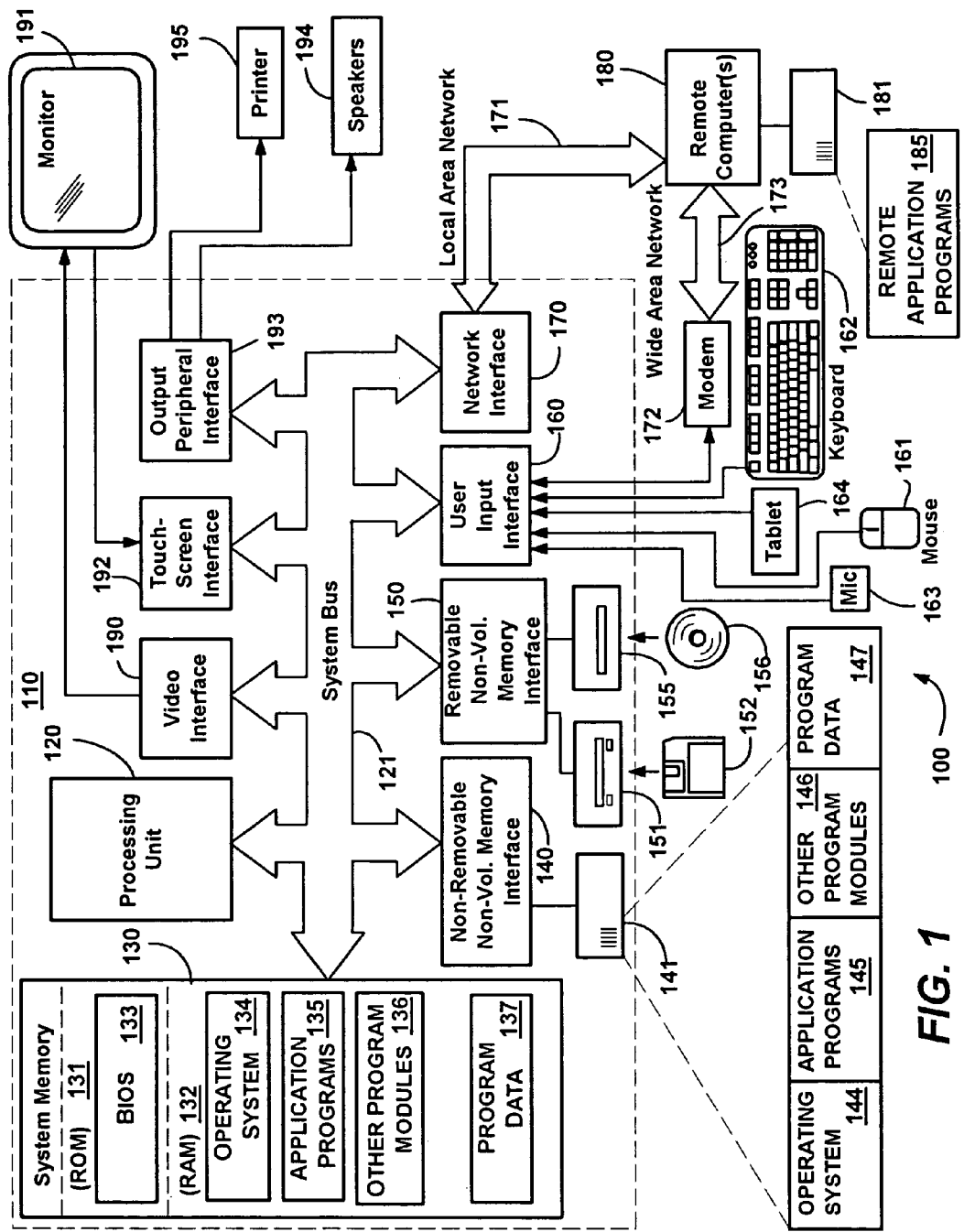
FIG. 1 is a block diagram generally representing a computer system into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, discussed above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet. When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Telephony Controls

The present invention is generally directed towards providing a user interface including telephony controls for a personal computer with integrated telephony capabilities. Such a personal computer may be connected to telephone equipment for accepting incoming calls of various kinds such as analog Public Switched Telephone Network (PSTN), private branch exchange (PBX), cellular telephony or VoIP. To this end, the computer is generally arranged as a central communications point for multiple communications-related devices, such as generally described in the related copending U.S. patent application Ser. No. 10/429,905 entitled "Real-Time Communications Architecture and Methods for use with a Personal Computer System." Accordingly, the present invention provides an enhanced user interface with telephony controls for such a computer so that users may activate and interact with telecommunications applications such as handling phone calls and voice mail. As will be understood, the various telecommunications interfaces, telephony controls, communication channels, devices and scenarios described herein are only examples, and there are many others to which the present invention will apply.

Figure 2:
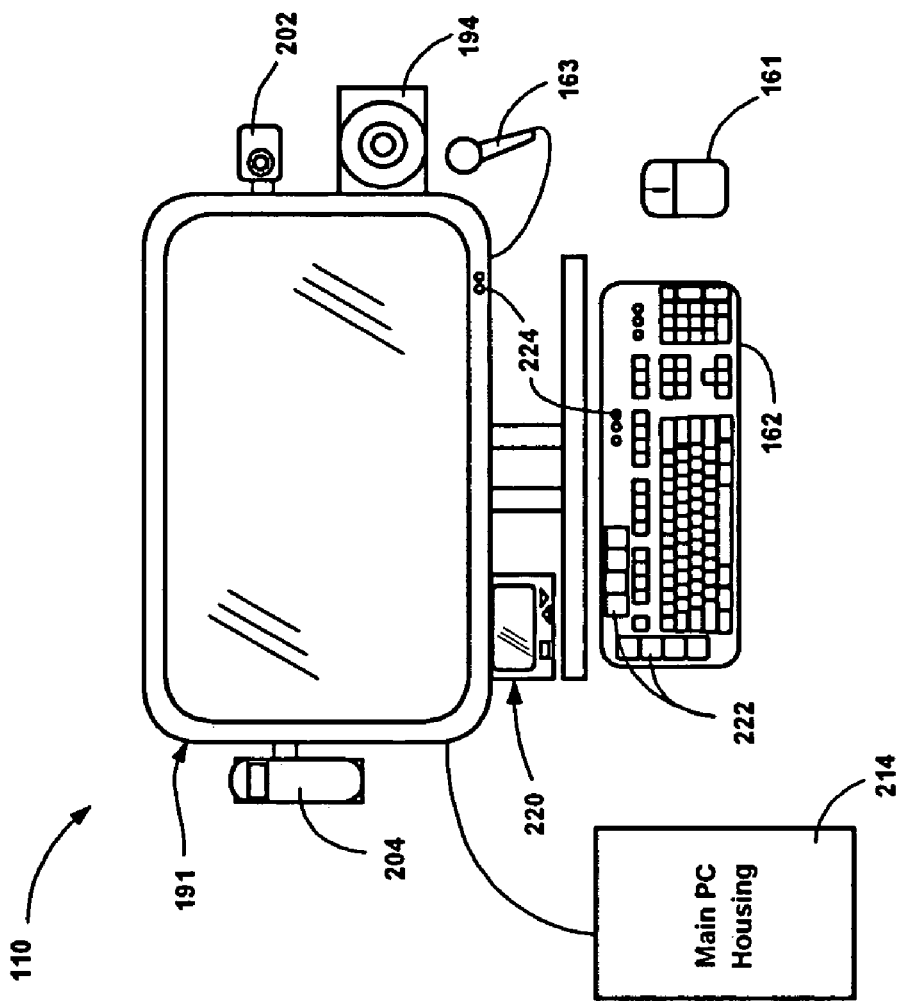
FIG. 2 is a general representation of a computer system arranged with integrated communications-related devices and telephony controls, in accordance with an aspect of the present invention.

Turning to FIG. 2 of the drawings, there is shown a computer system, such as the computer system 110 of FIG. 1, in which various communications-related devices are integrated. For example, the computer system 110 includes a monitor 191 having an attached camera 202, an attached telephone (e.g., handset) 204, and an attached speaker 194, which along with a microphone 163, may function as a speakerphone. Other devices not separately represented in FIG. 2 include mobile communications devices such as a cellular telephone or other mobile computing device capable of connecting in some way (e.g., by wired cradle or Bluetooth™ technology) with the computer system. Although shown as individual devices in FIG. 2, it is understood that any or all of these devices, such as the speaker 194 and microphone 163, may be combined into a unitary assembly, or built into other devices, such as the monitor 191. In any event, each of these devices may be present and if so are connected directly or indirectly by a wired or wireless connection to interfaces at the main PC housing 214 (containing at least the motherboard, but also typically containing some non-volatile storage). As used herein, the term "connect" and its variants and "couple" are equivalent and generally mean that there is some type of information capable of being transferred between one entity and another, regardless of whether directly or indirectly via any intermediaries and/or any transformation of the information.

Also represented in FIG. 2 is an auxiliary display device 220, such as for displaying caller ID data or like information as described below. The auxiliary display 220 is typically small (relative to the main display screen 191), and may be the display of another device, such as the screen of a mobile computing device, but may also be a dedicated display, such as one that is operably coupled to the computer operating system when the computer system 110 is in a powered-up state. Further, note that the auxiliary display need not be an actual display, but can be a projection (e.g., onto a wall) of the information. The auxiliary display device 220 may provide some of its own processing and storage resources, so as to remain functional to some extent when the computer operating system is not running. The keyboard 162 and/or monitor 191 (and/or possibly the pointing device 161) may also include non-conventional buttons 222, such as buttons related to telephony controls, and non-conventional LED indicators 224, such as indicators related to telephony controls.

Figure 3:
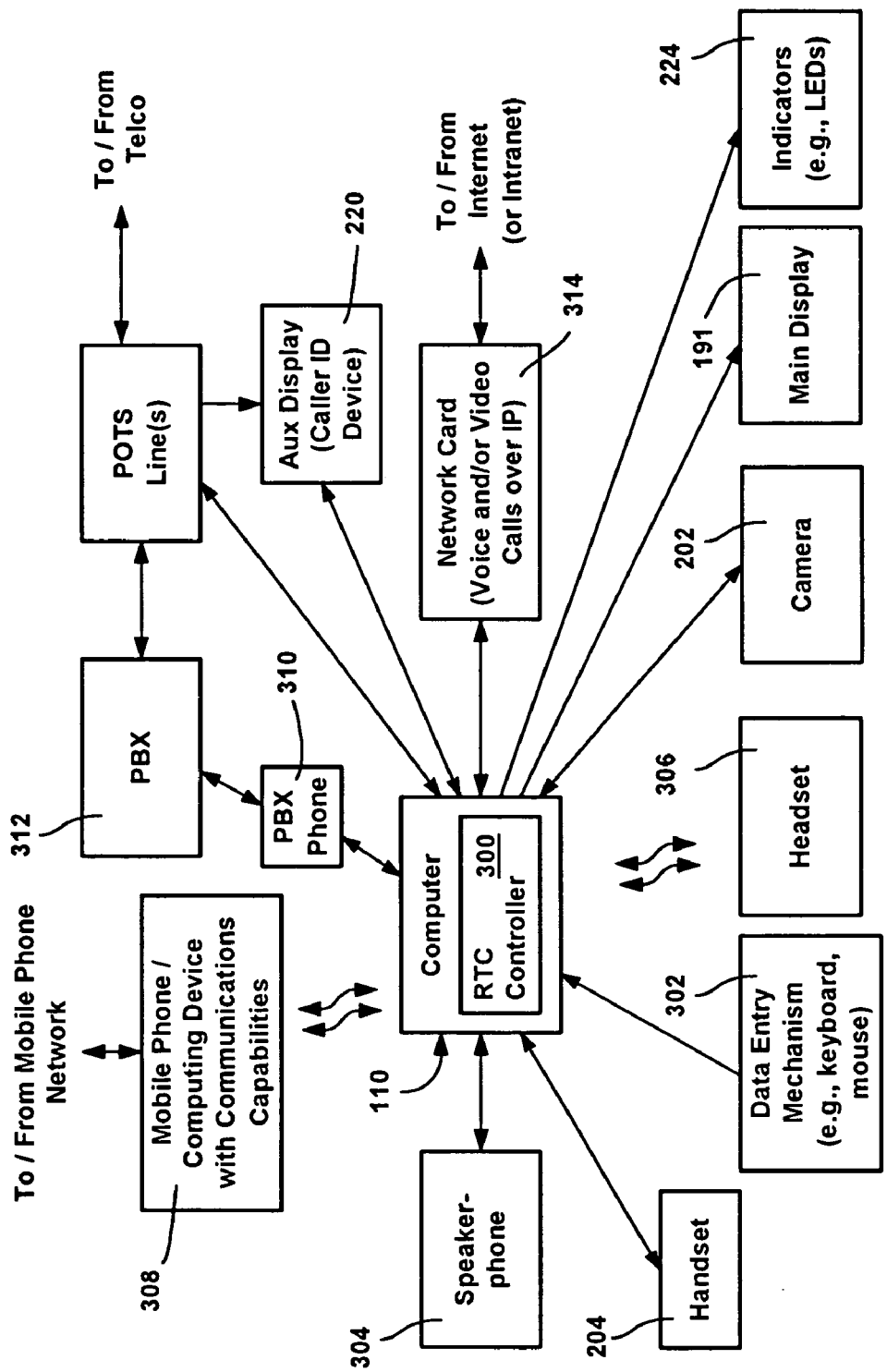
FIG. 3 is a block diagram generally representing the central control of communication devices and connections to communications channels, in accordance with an aspect of the present invention.

As generally represented in FIG. 3, the computer system 110 may include a real-time communications controller 300, primarily implemented in a software component or set of software components, that intelligently handles various aspects of a user's real-time communication needs, including facilitating communications in general, switching communications to and from appropriate devices, and/or transitioning communications among the various communications channels and/or types of communication. Note that the real-time communications controller 300 need not be built into the computer system 110, but can connect thereto as an add-on device, such as via a USB connection.

To handle a user's various communications needs, the real-time communications controller 300 allows a user to connect to various communication channels (e.g., a telephone company switching network, a mobile phone network, the internet or an intranet, and virtually any other local area or wide area network over which communication is possible) using the various communications-related data input/output devices. In general, the user is able to input data via any input mechanism, e.g., any microphone on any device, via any text or pointing-based user data entry mechanism 302 such as the keyboard and/or mouse, and/or the camera 202, and have that data configured as appropriate (e.g., converted from speech to text) and sent to an appropriate (one or possibly more) of the available communication channels. Similarly, the real-time communications controller 300 is able to receive data and output appropriate data to the user on any one or more of the output mechanisms, such as the speaker of a speakerphone 304 when the user has selected that device, the handset telephone 204 when lifted, a headset 306 if activated, the mobile phone or similar computing device 308 if selected, a PBX phone 310 connected to a PBX mechanism 312 and/or a network card 314. When video, graphical and/or text information is available, data can also be displayed on the main display 191 (if active), and/or the auxiliary display 220. Note that some of the devices are represented in FIG. 3 as directly connected to the computer system while other are shown as being wireless; however it is understood that any device may be wired or wireless. For example, a typical mobile computing device or mobile telephone may be cradled and thus "wired" to the computer, and/or may integrate a cellular phone, Wireless Ethernet (also known as 802.11b or Wi-Fi), and/or Bluetooth™ wireless technology.

Figure 4:
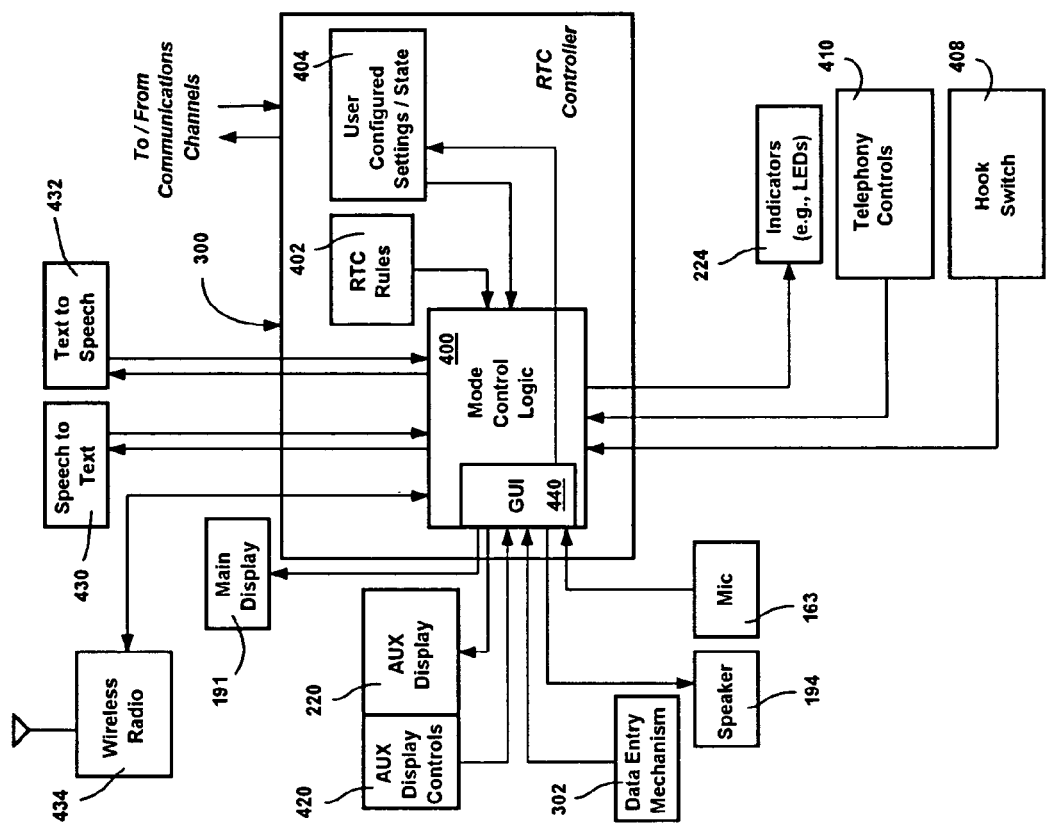
FIG. 4 is a block diagram generally representing components to couple various devices and control and display connection state in accordance with an aspect of the present invention.

In accordance with an aspect of the present invention, the real-time communications controller 300 controls various communication modes for the user, thereby removing much of the user's need to deal with device and connection considerations. As generally represented in FIG. 4, this is accomplished by responding to the user's actions, via mode control logic 400 in the real-time communications controller 300 that follows various real-time communication rules 402 and/or is based at least in part on other user-configurable settings and a current operating state 404. The mode control logic 400 likewise responds to external events, such as incoming calls, pages, text messages, forwarded voicemail messages, and so forth.

User actions can occur and be detected in any number of ways, including essentially any way of providing user action data or intended action data to a computer system. For example, such actions can include lifting or replacing the attached handset, which correspondingly actuates a hook switch 408 that is connected to the real-time communications controller 300, and thus can be detected as state data. Telephony controls 410, such as in the form of buttons on a device such as a talk button or buttons on the keyboard or monitor, (e.g., a speakerphone button, a flash button, and so on) can similarly provide user action information, as can a PBX telephone 310 or other computing device/telephone 308 (FIG. 3) connected to the computer system. Controls 420 accompanying the auxiliary display 220, such as in the form of scroll buttons and possibly an enter or select button (or equivalent button elsewhere on the system such as the flash button), can also provide user action data, as can the computer data entry mechanisms 302 such as a keyboard and mouse. Any microphone, such as the microphone 163, can also provide user action data, e.g., via speech recognition (command and control) performed with a speech to text recognizer 430. Text may also be converted to speech by an appropriate converter 432, such as when the user enters text to leave a message, but instead actually leaves a voice message on a called device, e.g., when the logic 400 detects that forwarding text would not be appropriate. User action information may also be communicated by wireless radio 434, and/or from a network connection or other communication channel. Motion and/or proximity sensing can likewise serve as a user action sensor.

Where appropriate, a graphical user interface component 440 shown as part of the mode control logic 400 (but possibly anywhere in the computer system, such as in another application program) may facilitate entry of the user action information. For example, the user may interact with one of the displays to select a displayed telephone number for connecting or reconnecting with a person or device at that number.

Similarly the system may output information to the user in any feasible manner, including via the user interface when appropriate. Essentially, anything capable of outputting something that can be sensed by a user can serve as an output mechanism, including the displays 191 and/or 220, lights and other indicators 224, the speaker 194 or other audio generating device such as a ringer on a cell phone, and other mechanisms such as one that provides tactile feedback (e.g., a vibrating cell phone). Thus, as used herein, the term "display" is only an example, and is not limited to visible information, but can include any sensed output. For example, a hook indicator in the form of an LED may be configured to flash red to indicate an incoming call, be lit green when off hook, blink amber when the call is on hold, and blink on-and-off when a call is muted. A tone and pattern can "display" the same information audibly.

Moreover, the present invention allows for various levels of computing skill. In general, the telephony controls 410 and the hook switch 408 that are provided allow the user to take advantage of much of the real-time communications controller's functionality without ever having to operate the graphical user interface software 440. However, to accomplish more sophisticated operations as desired, a user can also connect via the user interface 440, e.g., to automatically dial calls, answer via a mouse click, customize settings and preferences and so forth.

In general, the logic 400 receives user action data or remotely communicated data (such as an incoming call), and based on various real-time communications rules 402 and user configurable settings 404, responds in a proper manner. For example, as described below, for an incoming call, the mode control logic 400 will display the caller ID information on the auxiliary display 220, or possibly the main display 191 if so configured by the user, sound a ring or call waiting tone on the speaker 194, and wait for a user action. If the user presses a telephony control button such as a speakerphone button, the call will be connected to the appropriate device, e.g., routed to the speaker 194 and microphone 163. Any other audio, such as music that the user was listening to, may be automatically muted until the call is complete, e.g., until the user again presses the speakerphone button to disconnect.

The real-time communications controller 300 thus automatically and transparently responds in an appropriate manner to a user's needs. By way of example, consider the example above of a user who is working at the computer when a call comes in. Instead of figuring out what type of call it is, finding the device necessary to (possibly) answer it, and so on, the user merely glances at the auxiliary display, decides whether to take the call, and if so, selects any appropriate device to answer. Because the real-time communications controller 300 is the center of communication, a call to any of the user's landline telephone devices or any (smart) cellular telephone will relay the caller ID data to the real-time communications controller 300, which will display that caller ID data on the auxiliary display 220 as any other call. For the same reason, the user can answer any incoming call on the speakerphone 304, the handset 204, the headset 306, the cellular telephone or mobile computing device 308 and so on. The user need not even know whether a given call came in on a given communications channel, such as the cellular channel instead of a POTS channel or network channel, although for reasons such as cost of airtime, the user may want to know this information. Regardless of the device and the channel, the user is provided access to a universal address book, call log, and inbox.

Moreover, the real-time communications controller allows a user to transition between communication channels. Thus, for example, a user who receives a POTS telephone call can answer, talk for awhile, and switch that call over to a mobile phone to continue the conversation away from the computer system. Note that this is not conventional call forwarding set up in advance for switching at the central switching office or the like, but rather on-demand transitioning during a telephone call. For example, rules 402 can be set up to favor landline over cellular for local calls since there is no airtime charge, however cellular long distance may be favored over landline when there is no additional charge and the user is likely to have unused airtime before the next billing cycle. Voice over IP may be the most favored, but may not be available when the computer system is powered down.

One simple way to accomplish transitioning live connections is via a different telephone line relative to the source of the call. For example, if a user is leaving his or her office, the real-time communications controller 300 can transparently (or mostly transparently) establish a cellular connection to the user's mobile telephone device on that other line and connect the other caller to that mobile telephone device through the real-time communications controller 300. Voice over IP can similarly be used.

Three-way and conference calling capabilities can also be leveraged, e.g., a user can walk into his or her office while connected to another person via a cell phone, the real-time communications controller 400 can establish another call to the other party via a POTS, PBX or voice over IP call, and when connected, terminate the cellular phone call.

In addition to switching and transitioning among devices and channels, the real-time communications controller 300 can switch and/or transition among types of communication. For example, a user can respond to a telephone call with an instant message, either automatically or by typing/speech recognition, e.g., to notify the caller that the call was received but could not be answered at that moment. In the event that the real-time communications controller 300 has the caller ID and/or other information from that call, possibly including preset knowledge such as that the incoming telephone number belongs to a mobile device, the real-time communications controller 300 can adjust the instant message as appropriate, e.g., convert a text message to speech to leave a voice message when the call was known to be from a mobile phone that does not handle text, or when the user is known to be traveling. Note that the instant message does not have to be sent to the same device that called the user, e.g., a user can respond to a received phone call from a conventional telephone with an instant message to the caller's computer system. A simple database lookup or the like by the mode control logic can provide the recipient's address from the caller ID data so that the user does not even have to enter this information.

As another type change, when available, the present invention can start with an audio call and add video (one-way or two-way) and/or instant messaging as desired by the parties, or start with an instant message and add audio and/or video. For example, a user can press a camera button, or select video via a mouse click, to establish a video connection and start transmitting video. A video call can similarly be transitioned to a non-video (e.g., audio-only) call. In general, the present invention facilitates switching and/or transitioning between any modes of communication.

Figure 5:
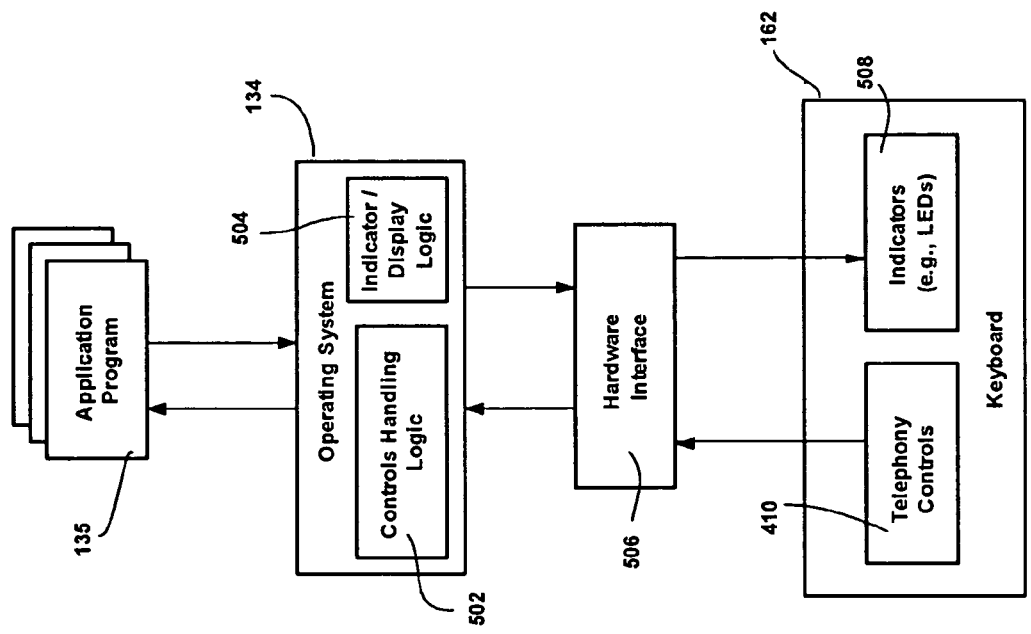
FIG. 5 is a block diagram generally representing the components in an exemplary embodiment of the telephony controls, in accordance with an aspect of the present invention.

Turning to an explanation of the operation of the present invention with particular reference to the telephony controls 410, FIG. 5 presents the components in an exemplary embodiment of the telephony controls 410. Those skilled in the art will appreciate that the functionality implemented within the blocks illustrated in the diagram may be implemented as separate components or the functionality of several or all of the blocks may be implemented within a single component. For example, a separate library may be implemented that contains the functionality of the control handling logic and the functionality of the display logic. In such an implementation, executables linked to the library may send control events directly to the control interface when they are executing on the computer system.

FIG. 5 shows how the telephony controls 410 may be used to perform communications-related tasks. In general, state changes or the like in the controls are provided to the control handling program (e.g., the operating system 134, real-time communications controller 300, or an application program 135), along with data that identifies the control. Via controls handling logic 502, the control handling program then acts in the current context corresponding to the control. This may include generating one or more hardware or software events or commands, such as answering an incoming call, switching from a call on one line to a call on another line, conferencing calling, and so forth.

The control handling program also controls any indicators 508 that are present as described above, via indicator display logic 504 to convey information to the user. For example, the control handling logic 502 and the indicator/display logic 504 communicate with the hardware interface 506 to receive input from the telephony controls 410 and send output to the indicators 508 for display. Note that the indicators need not be LEDs, but include any type of mechanism that outputs information that is capable of being sensed by a user, including visual, audible and tactile output. Each of the indicators may be related to one of the controls, and thus each indicator may be incorporated into or positioned proximate its corresponding control. Where the indicators are LEDs, colors and illumination patterns (frequencies, duty cycles, number of pulses, and so forth) may be varied to convey different information to users regarding each control.

Further, although an operating system 134 (or real-time communications controller 300 or some application program 135) is shown in FIG. 5 as handling the telephony controls, it should be noted that the computer system need not be fully operational for the telephony controls 410 and/or the indicators 508 to work in accordance with the present invention. Indeed, some of the controls may still work when the computer is powered down, at least to a default extent or to an extent configured by a user. For example, the user may want the telephony controls to work as a conventional appliance when the computer system is powered down, so that the user may answer incoming calls using the telephone handset, speakerphone and caller-ID device. Further, the user may limit the extent of the communications based on the computer system state, e.g., when the user is not logged in, long distance calls may be blocked, calls to a certain prefix may be blocked, and so forth. Any tasks that do not require a running operating system or application program similarly may remain operational and use the telephony controls when the operating system or application program is not available or in standby mode.

To handle the controls and communications in such a powered-down mode, the control handling logic may be loaded into executable non-volatile memory, operated with a secondary processor, and so forth, so that communication works as long as some power is available, even though the disk, main processor, main display, network card and/or other parts of the system are powered down.

Figure 6:
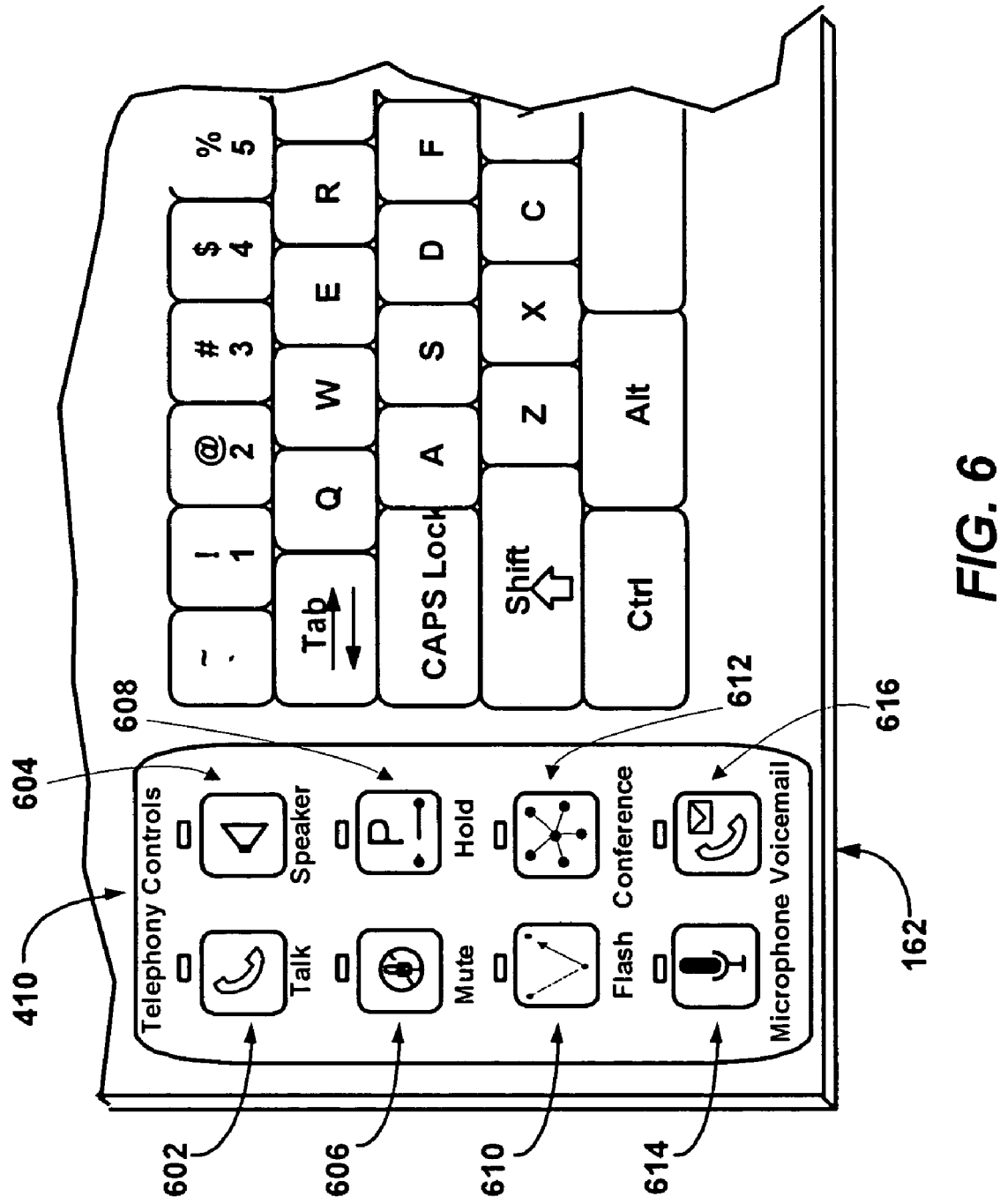
FIG. 6 is a general representation of a partial keyboard with telephony controls incorporated into the keyboard, in accordance with an aspect of the present invention.

FIG. 6 presents a general representation of a partial keyboard with telephony controls 410 incorporated into the keyboard 162. The telephony controls 410 may include a Talk button 602, a Speaker or Speakerphone button 604, a Mute button 606, a Hold button 608, a Flash button 610, a Conference button 612, a Microphone button 614, and a Voicemail button 616. As is appreciated, other telephony control buttons may be included such as a Transfer button for transferring a call to another person, or a Send button for initiating a call, or an End button for ending a call, and so forth. In one embodiment, there may also be an optional Record button (not shown) in close proximity to the telephony controls 410 for use in responding to voice mail.

Where there is an attached telephone or handset 204 as shown in FIG. 2, a cradle hook switch is mechanically integrated into the handset cradle. A cradle hook switch is a two-position toggle switch that closes when the handset is off hook and that is open when the handset is in the cradle. Lifting the handset from the cradle usually takes the handset off hook and displays a dialog box for selecting the person to call. When there is an incoming call, lifting the handset will answer the call, taking the handset off hook. If there is another incoming phone call while a call is already in progress, depressing the cradle hook switch quickly will toggle between the two calls. During a call, replacing the handset in the cradle will hang up the call. If the handset is not the active receiver during a call, lifting the handset from the cradle will make it the active receiver and switches off the old active receiver such as the speakerphone 304 or headset 306.

The telephony controls 410 shown in FIG. 6 are used to handle telephony communications in general, including making calls, answering calls, switching communications to and from appropriate lines or devices, operating voicemail and/or other types of telephony applications. When there is an incoming call, pressing the Talk button 602 will answer the call, taking the receiver off hook. The Talk button 602 is usually integrated into the keypad of telephone devices, such as a headset 306 or handset 204. The Talk button 602 performs similar functionality to the hook switch and can generally be considered similar to the hook switch operation. In general, either a talk button or cradle hook switch (or at least a graphical user interface equivalent) is required for each phone handset 204 or headset 306. The Talk button 206 comprises a single-throw, momentary switch that toggles the hook state for a telephone receiver. Like the cradle hook switch, its primary function is to initiate or answer a call, and then hang up when the conversation is finished. During a call, pressing the Talk button 602 on the active receiver will hang up the call. Pressing the Talk button 206 on another receiver will have the effect of making it the active receiver, switching off the old active receiver (handset 204 or headset 306). When there is an incoming call, pressing the Talk button 602 will answer the call, taking the receiver off hook. If there is another incoming call while a call is already in progress, pressing the Talk button 602 will toggle between the two calls.

The Speaker or Speakerphone button 604 is a special case of the Talk button 602, used where the incoming call is broadcast over a speaker and audio is collected via a far field microphone. In a cordless handset with speaker phone capabilities, it may be important to indicate to the user that the speakerphone is active to differentiate it from the handset talk switch. The Speakerphone button 604 similarly comprises a single-throw, momentary switch to toggle the hook state for a speakerphone. Its primary function is to initiate or answer a call, and then hang up when the conversation is finished.

If a virtual speakerphone is implemented using the microphone 163 and speakers 194 that are already part of the computer system, the Speakerphone button 604 may be located on the keyboard as shown in FIG. 6 (although it is alternatively feasible to have such a keyboard Speakerphone button 604 work with another speakerphone). This button usually takes the speakerphone off hook and displays a dialog box for selecting the person to call. During a call, pressing the Speakerphone button 604 when the speakerphone is the active receiver will hang up the call. If the speakerphone is not the active receiver, this will have the effect of making it the active receiver, switching off the old active receiver. When there is an incoming call, pressing the Speakerphone button 604 will answer the call, taking the speakerphone off hook. If there is another incoming call while a call is already in progress, pressing the Speakerphone button 604 will toggle between the two calls.

Because the talk button or speakerphone button state may not be readily apparent to a user, a hook indicator light such as an LED may be used in conjunction with a Talk or Speakerphone button, and, for example, may be located adjacent or integrated into the Talk button or Speakerphone button. The Talk button 602 and the Speakerphone button 604 are each shown in FIG. 6 with a hook indicator light located above them. A single hook indicator light may alternatively be used. The hook indicator may indicate state via various colors and flash patterns, e.g., steady state unlit when the receiver is on hook, steady state green when the receiver is off hook, or steady state red when no service is available. A flashing indicator, such as with a "wink" duty cycle can overlay the steady state, e.g., a red wink overlay can indicate call waiting, or an amber flash overlay can indicate a call holding. The call waiting overlay indicator will continue to blink as long as the user can pick up the phone to connect to the incoming caller, even if the call is no longer ringing. This allows call screening when callers are recording voice mail. The call holding overlay is generally only needed when a dedicated hold indicator is not present.

The Mute button 606, also known as a Call Mute button, allows the user to quickly mute the default system audio input device such as microphone 163 or the microphone in the handset 204 or headset 306. The Mute button 606 is operable as a momentary switch that toggles the mute state for a telephone receiver between mute and not-mute. The Mute button 606 can be a stand-alone button as illustrated in FIG. 6, or alternatively, may be integrated into the handset 204 or the headset 306. The indicator light should be located adjacent to the Mute button 606 or integrated into the control itself. Pressing the Mute button 606 mutes audio input and sets the call mute indicator to amber. Pressing it again restores the audio input and restores the call mute indicator to green.

The Hold button 608 places current call on hold and frees the receiver for performing other telephony operations such as making another call, or hanging up to pick up on another receiver, and so forth. The Hold button 608 is operable as a momentary switch that toggles the hold state for a telephone receiver between an on-hold state and a not-on-hold state. An indicator light may be located adjacent to the Hold button 608 or integrated into the control itself. Pressing the Hold button 608 places the current call into a call waiting state and sets the hold button indicator from unlit to amber. Pressing the Hold button 608 again moves the call from the call waiting state to the current call on the active receiver and resets the hold indicator as unlit.

The Flash button 610 is often used for alternate line selection and generates a momentary on hook condition to signal the application. If there is an incoming call, an indicator light for the Flash button may blink red to notify the user of a waiting call. When the user is notified of a call waiting, pressing the Flash button 610 will place the current call on hold and answer the incoming call. With calls on hold, pressing the Flash button 610 places the current call on hold and picks up the next call in the hold queue. When there are no incoming calls waiting, the Flash button indicator light is reset as unlit.

The Conference button 612 initiates a conference call. Pressing the Conference button 612 joins the current call with one or more calls waiting on hold. When the Conference button 612 is pressed, the indicator light associated with it is set to green. The indicator light is reset as unlit when the last caller or the receiver hangs ups.

The Microphone button 614 usually allows the user to switch the default system audio input device from the handset 204 or headset 306 to personal computer microphone 163. The Microphone button 614 may be operable as a momentary switch that toggles the microphone state for a telephone receiver between the default audio input device and a secondary audio input device. The indicator light should be located adjacent to the Microphone button 614 or integrated into the control itself. Pressing the Microphone button 614 activates audio input from the personal computer microphone 163 and sets the Microphone button indicator to green. Pressing it again restores the audio input to the default system audio input device and resets the Microphone button indicator as unlit.

The Voicemail button 616 is used to access received voicemail. Whenever a new voicemail is received, the indicator light is set to green to alert the user. Pressing the Voicemail button 616 launches the voicemail application and may begin playing recorded voicemail messages. Additionally, the voicemail application may present a list of voicemail messages onscreen and allow a user to access and respond to voicemail messages using transport controls such as play, previous, and next. Once playback has stopped, the Voicemail button indicator is reset as unlit and a user may respond by calling the sender using the telephony controls or by sending a recorded message via the voicemail application.

Figure 7:
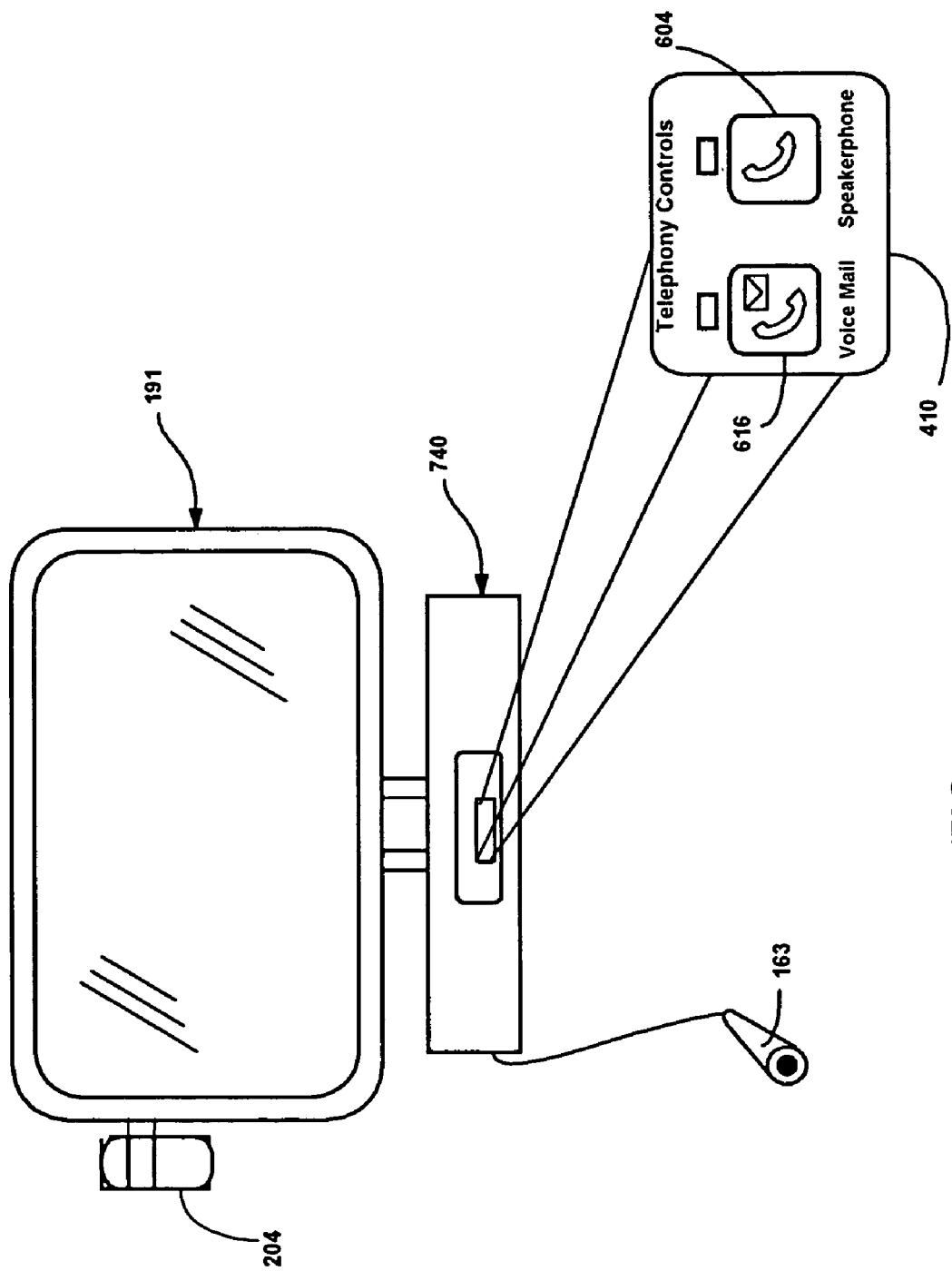
FIG. 7 is a representation of a control panel positioned beneath a computer monitor with telephony controls incorporated into the control panel, in accordance with an aspect of the present invention.
Figure 8:
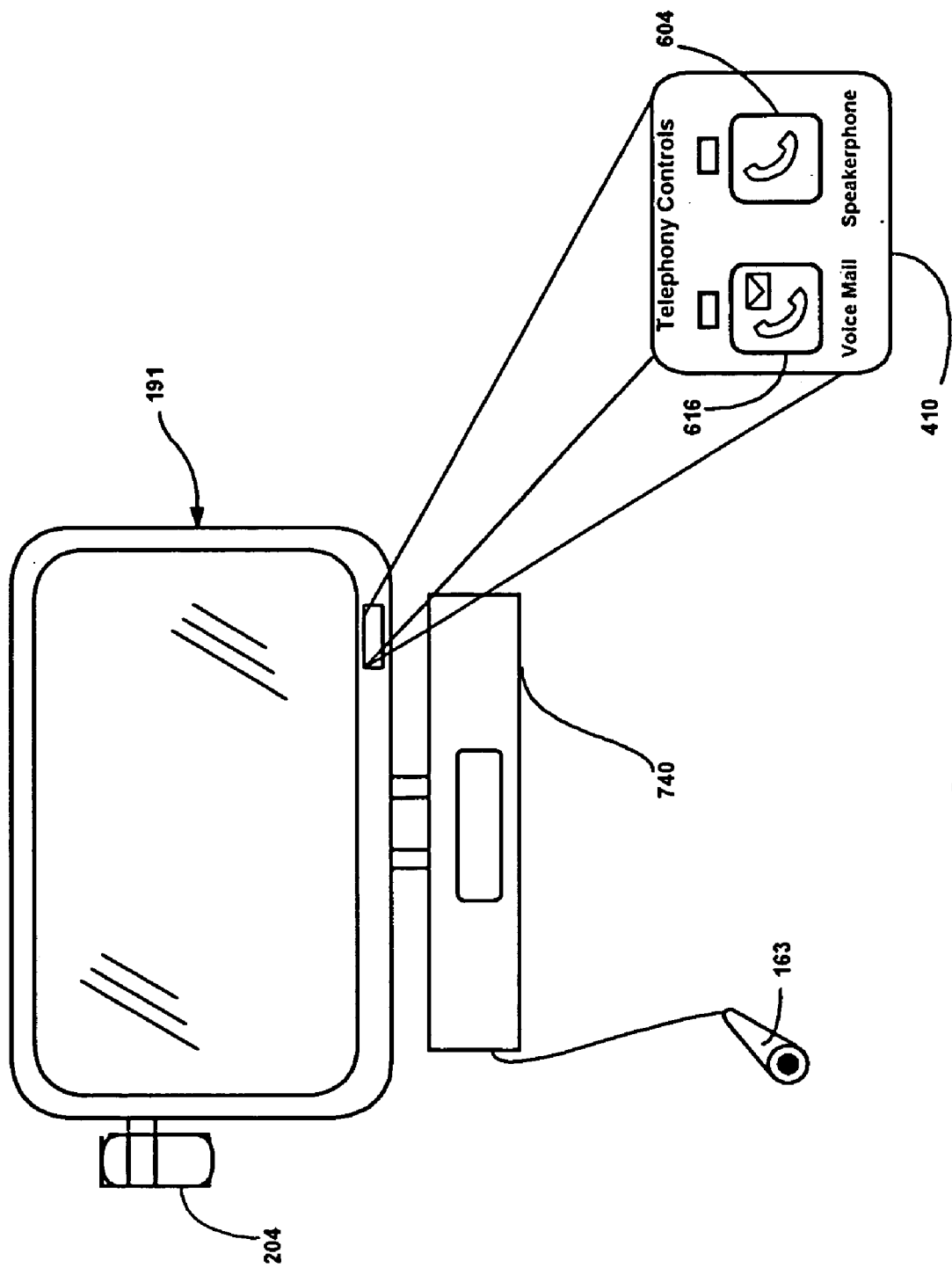
FIG. 8 is a representation of telephony controls incorporated into a monitor, in accordance with an aspect of the present invention.

It will be appreciate by those skilled in the art that the telephony controls 410 illustrated in FIG. 6 as incorporated in a keyboard is an exemplary configuration and that the present invention may be practiced using other configurations such as the configuration illustrated in FIG. 7 with the telephony controls located on a communications panel. In FIG. 7, two telephony controls 410, the Speakerphone button 604 and the Voicemail button 614, are shown magnified from their location on a control panel 740 which is attached to or underneath the main display 191. This location may allow good visibility of the telephony controls 410, but it may not be considered as convenient by some user to press the telephony control buttons as it would be if they were located on the keyboard as illustrated in FIG. 6. FIG. 8 shows another exemplary illustration of the same two telephony controls located on the bezel of a monitor 191. Other telephony controls 410 may be located elsewhere. As discussed previously, the Talk button 602 is usually integrated into the keypad of telephone devices, such as a headset 306 or handset 204.

Figure 9:
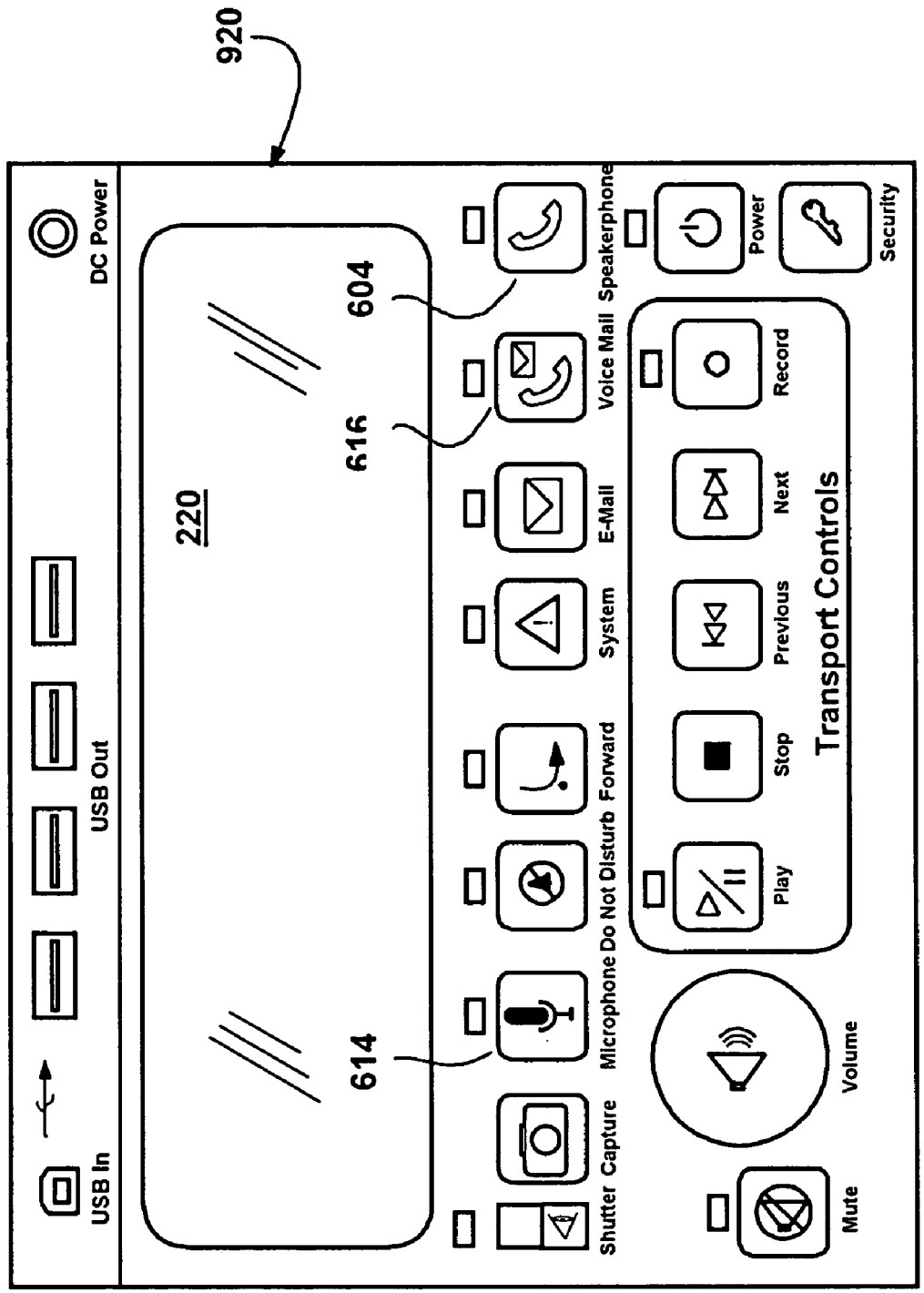
FIG. 9 is a representation of an alternative control panel with telephony controls, in accordance with an aspect of the present invention.

Another alternative control panel 920 incorporating a few telephony controls 410 and including an auxiliary display 220 is shown in FIG. 9. Note that the telephony controls 410 in FIG. 9 are not grouped necessarily together and may be arranged among other control buttons. For example, the Microphone button 614 is not adjacent to the Voicemail button 616 and the Speakerphone button 604. Thus, one or more telephony control 410 buttons need not be grouped with other telephony control buttons, but may be grouped with some other set of buttons, or may be an independent button. In fact, the Microphone button 614 may be placed on a microphone 163, headset 306, handset 204, and so forth. One or more of the telephony controls 410 may also be an add-on to a computer system, such as by providing a button coupled to a USB or infrared port, or a as a Bluetooth™ device or other wired or wireless connection. A wired or wireless telephony control button, such as constructed to be held by a user, may also be provided either stand-alone or among buttons of a remote control.

Figure 10:
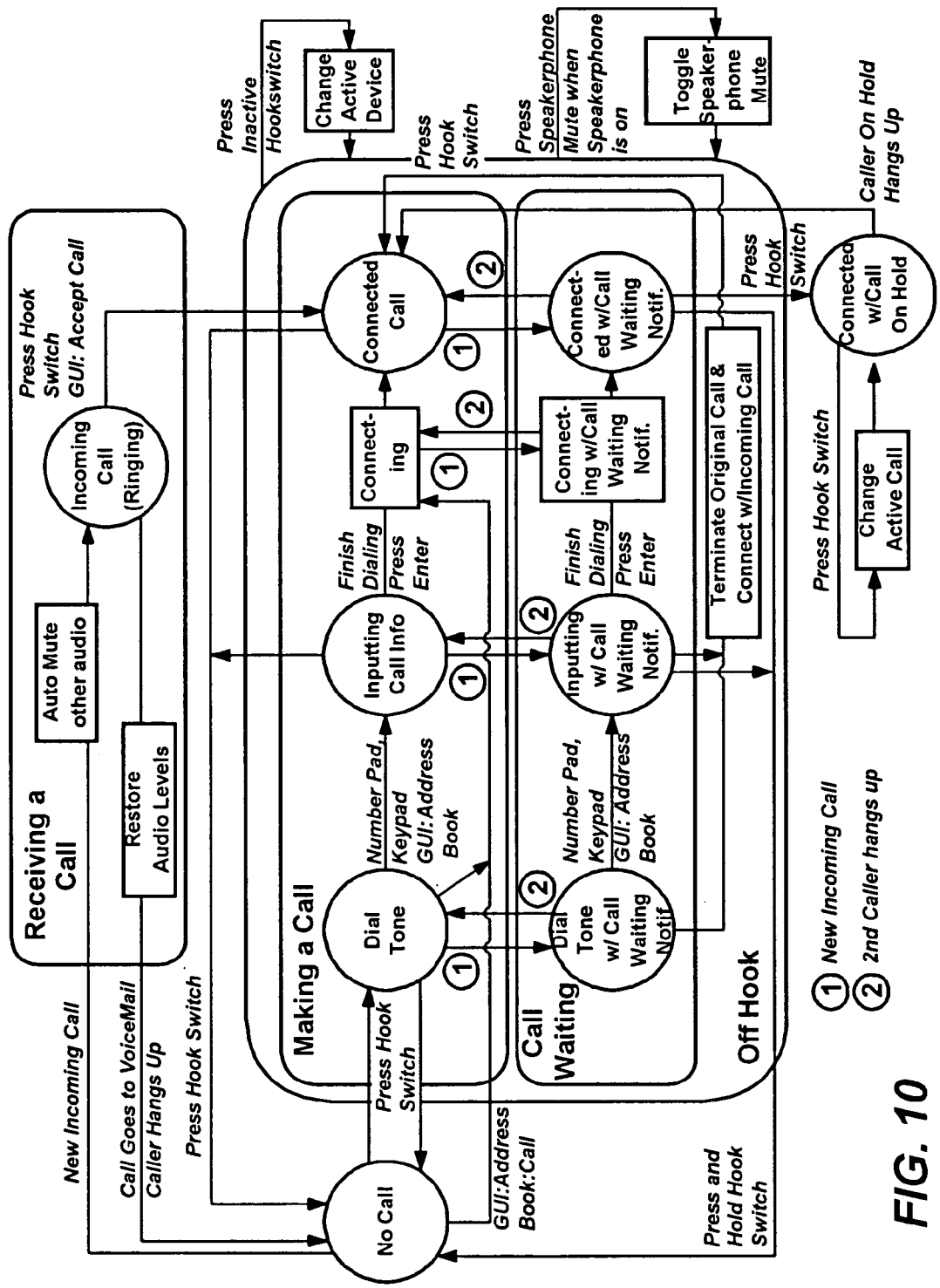
FIG. 10 is a general state diagram representing states of operation when making a call, receiving a call, and when a call is waiting, in accordance with an aspect of the present invention.

FIG. 10 represents a general overview of the logic 400 that summarizes various states of operation. For example, as represented in FIG. 10, the hook switch operates in a number of ways, including using it to terminate a call, lifting it to make a receiver active and pick up waiting line, as a flash button to switch lines or terminate a call if no lines are waiting. The hook state may be toggled between "off hook" and "on hook" by either lifting the handset from the cradle with a mechanically integrated hook switch, pressing the Talk button 602, or pressing the Speaker button 604.

FIG. 10 also represents a number of user interaction scenarios with respect to real-time communications, including handling an incoming call and making a call. To make a phone call, the user lifts the handset or presses the Talk button 602, or presses the Speakerphone button 604, and then dials a number. Alternatively, the user may select a contact from the display 220 or graphical user interface 440, or employ voice dialing. When initiating a call from the graphical user interface 440, such as within the context of a communications application such as Microsoft® Outlook, the user can initiate a phone call from any standard contact object supported by an API. The operating system takes the default receiver off hook and makes the connection using a preferred or specified telecommunications service.

To answer a phone call, the user lifts the handset, presses the Speakerphone button 604, or presses the Talk button 602. Before answering, the user has the ability to view caller ID, and possibly other pertinent contact information displayed with the notification message (on the main display or auxiliary display), allowing the user to pre-screen the call. Depending on preferences, the user can then choose to pick up the call or transfer it to voice mail, which may include transferring it to one of a plurality of custom or standard voice mail messages. While the caller is recording voice mail, the user can monitor the incoming recording and pick up the receiver, similar to a traditional answering machine.

The examples below provide additional interaction detail for common telephony functions, including an incoming call scenario, wherein the real-time communications controller sounds the ringer and blinks the Talk button indicator, while using caller ID information to display contact information. When the user presses the Talk button, a Microphone button, camera button, or picks up the handset, or presses the hook (talk) switch on the headset, the real-time communications controller 300 may light an indicator for the active receiver. The user receives the call, and can switch among devices, e.g., to switch to the speakerphone, the user presses the Speakerphone button 604; to switch to the handset, the user picks it up (activating the hook switch); or to switch to the headset, the user presses the hook (talk) switch on the headset. A cell phone or mobile computing device may be similarly used, even without actually switching the call to the cellular network (which may require some additional user action). When the user switches active receivers, the system disables the previous receiver to prevent feedback, and updates indicators to reflect the active receiver.

If the call supports video, the real-time communications controller blinks the camera indicator. If the user presses the blinking camera button, or automatic video is set by user preference to automatically stream video when video is available, the system opens the video monitor, lights the camera indicator, and starts streaming video.

To mute a component, the user can take an appropriate action. For example, to mute video and audio, the user presses the camera button, whereby the real-time communications controller blinks the audio and video indicators until the camera button is pressed again or the call is terminated. To mute video only, the user shuts the camera's privacy shutter, whereby the system un-lights the video indicators and closes the A/V monitor, but maintains the audio indicator. To mute speakerphone audio, the user may press the Speakerphone button 604. To hang up, the user presses the hook switch for the active receiver such as placing the handset 204 in the cradle if the handset is the active receiver or pressing the Speakerphone button 604 if the speakerphone is the active receiver.

To place a call, the user presses the Talk button 602, picks up the handset 204, presses the Speakerphone button 604, or presses the hook switch on headset. A dialog box is displayed for selecting the person to call. The system may also audibly ask through the active receiver, such as when voice dialing is enabled, as to who the user would like to call. The resulting input is used to select a contact from the dialog box, and the user can query to search and can re-query to refine the search, if necessary.

When the user makes a selection or acknowledges a match, contact information for the selected recipient is displayed with a status dialog box while the call is connecting. When connected, the user can switch devices as described above, and also switch modes, e.g., audio to video, and so forth, with the indicators operating in the above-described manner.

The user can also perform other communications-related tasks, including checking voice mail and call screening. For example, an indicator light may blink to indicate a voice mail, whereby the user can press the Voicemail button 616 to access voice mail. In one embodiment, this open the user's unified In Box. Call screening logic follows various rules, including showing caller ID information and contact summary data until, after a preset number of rings, the system stops the ringer and sends a voice mail message to an incoming caller. If the call screening option is enabled, the system echoes the incoming message to a system audio output device (usually the speaker). If the user presses the hook switch of any receiver, the system discards the message and switches to real-time voice, otherwise, when the user hangs up or after a certain time limit, the system stops blinking the Talk button indicator and files a voice message.

As can be seen from the foregoing detailed description, there is provided a system and method including an enhanced user interface with telephony controls for a personal computer with integrated telephony capabilities. These telephony controls allow users to intuitively activate and interact with telecommunications applications such as handling phone calls and voice mail. The system and method is fairly comprehensive in handling communications, as well as flexible and extensible to handle many user scenarios and usage patterns. Additional telephony controls may be easily added. The system and method thus provide significant advantages and benefits needed in contemporary computing and communications.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. A general purpose computer system for executing a telephony application, comprising:
    an application having telephony functionality for handling telephony-related communication signals, the application being enabled to execute telephony-related communication tasks and telephony functionality in response to user input;
    a graphical user interface providing a telephony control for inputting a plurality of telephony commands, the graphical user interface enabled to receive user commands;
    an operating system comprising control handling logic and indicator/display logic, and being operably coupled to the telephony control and the application, the operating system being enabled to receive an input command from the telephony control and to send the input command to the application; and
    a communications controller enabling a user to connect to each of a plurality of communications channels, the controller enabled to provide on-demand transitioning during a phone call, and the controller enabled to receive data and output data on each of a plurality of devices.

2. The system of claim 1 wherein the telephony functionality of the application comprises answering a telephone call.

3. The system of claim 2 wherein the telephony control comprises a talk button for inputting a command to answer the telephone call.

4. The system of claim 2 wherein the telephony control comprises a speakerphone button for inputting a command to answer the telephone call.

5. The system of claim 2 wherein the telephony control comprises a hook switch for inputting a command to answer the telephone call.

6. The system of claim 1 wherein the telephony functionality of the application includes the capability to place a telephone call.

7. The system of claim 6 wherein the telephony control comprises a speakerphone button for inputting a command to place the telephone call.

8. The system of claim 6 wherein the telephony control comprises a hook switch for inputting a command to place the telephone call.

9. The system of claim 6 wherein the telephony control comprises a talk button for inputting a command to place the telephone call.

10. The system of claim 1 wherein the telephony functionality of the application comprises switching from one telephone call on a first line to another telephone call on a second line.

11. The system of claim 10 wherein the telephony control comprises a flash button for inputting a command to switch the telephone call on the first line to the other telephone call on the second line.

12. The system of claim 1 wherein the telephony functionality comprises conferencing in a telephone call from a second line to a telephone call on a first line.

13. The system of claim 12 wherein the telephony control comprises a conference button that inputs a command to conference in the telephone call on the first line to the telephone call on the second line.

14. The system of claim 1 wherein the telephony functionality comprises placing a telephone call on hold.

15. The system of claim 14 wherein the telephony control comprises a hold button for inputting a command to place the telephone call on hold.

16. The system of claim 1 wherein the telephony functionality comprises muting the audio during a telephone call.

17. The system of claim 16 wherein the telephony control comprises a mute button for inputting a command to mute the audio during the telephone call.

18. The system of claim 1 wherein the telephony functionality comprises playing voice mail.

19. The system of claim 18 wherein the telephony control comprises a voice mail button for inputting a command to play voice mail.

20. The system of claim 1 wherein the telephony functionality comprises switching the default system audio input device from a handset to a personal computer microphone.

21. The system of claim 20 wherein the telephony control comprises a microphone button for inputting a command to switch the default system audio input device from the handset to the personal computer microphone.

22. The system of claim 1 wherein the telephony functionality comprises switching the default system audio input device from a landline to a cell phone.

23. The system of claim 1 wherein the telephony functionality comprises switching the default system audio input device from a cell phone to a speakerphone.

24. The system of claim 1 wherein the telephony functionality comprises switching the default system audio input device from a headset to a personal computer microphone.

25. The system of claim 24 wherein the telephony control comprises a microphone button for inputting a command to switch the default system audio input device from the headset to the personal computer microphone.

26. The system of claim 1 wherein the telephony control comprises a talk button operable as a momentary switch that toggles the hook state for a telephone receiver between on-hook and off-hook.

27. The system of claim 26 wherein the telephony control further comprises an indicator that uses at least one member of the set comprising visual, audible, and tactile representations for indicating the off-hook state.

28. The system of claim 1 wherein the telephony control comprises a hook switch that toggles the hook state for a telephone receiver between on-hook and off-hook.

29. The system of claim 28 wherein the telephony control further comprises an indicator that uses at least one member of the set comprising visual, audible, and tactile representations for indicating the off-hook state.

30. The system of claim 29 wherein the indicator comprising a visual representation illuminates with the color green.

31. The system of claim 1 wherein the telephony control comprises a speakerphone button operable as a momentary switch that toggles the hook state for a telephone receiver between on-hook and off-hook.

32. The system of claim 31 wherein the telephony control further comprises an indicator that uses at least one member of the set comprising visual, audible, and tactile representations for indicating off-hook state.

33. The system of claim 1 wherein the telephony control comprises a mute button operable as a momentary switch that toggles the mute state for a telephone receiver between mute and not-mute.

34. The system of claim 33 wherein the telephony control further comprises an indicator that uses at least one member of the set comprising visual, audible, and tactile representations for indicating the mute state.

35. The system of claim 34 wherein the indicator comprising a visual representation illuminates with the color amber.

36. The system of claim 1 wherein the telephony control comprises a hold button operable as a momentary switch that toggles the hold state for a telephone receiver between an on-hold state and a not-on-hold state.

37. The system of claim 36, wherein the on-hold state comprises having a telephone call on hold with the telephone receiver free for performing telephony operations.

38. The system of claim 36 wherein the telephony control further comprises an indicator that uses at least one member of the set comprising visual, audible, and tactile representations for indicating the on-hold state.

39. The system of claim 38 wherein the indicator comprising a visual representation illuminates with the color amber.

40. The system of claim 1 wherein the telephony control comprises a flash button operable to generate a momentary on-hook condition to signal the application of a telephony event.

41. The system of claim 40 wherein the telephony event comprises notification of a waiting telephone call.

42. The system of claim 40 wherein the telephony event comprises notification of a telephone call on hold.

43. The system of claim 40 wherein the telephony control further comprises an indicator that uses at least one member of the set comprising visual, audible, and tactile representations for indicating the event.

44. The system of claim 1 wherein the telephony control comprises a conference button operable to generate a momentary signal to the application to join the current call with one or more calls waiting on hold.

45. The system of claim 44 wherein the telephony control further comprises an indicator that uses at least one member of the set comprising visual, audible, and tactile representations for indicating the state of a conference call.

46. The system of claim 45 wherein the indicator comprising a visual representation illuminates with the color green.

47. The system of claim 1 wherein the telephony control comprises a microphone button operable as a momentary switch that toggles the microphone state for a telephone receiver between the default audio input device and a secondary audio input device.

48. The system of claim 47 wherein the telephony control further comprises an indicator that uses at least one member of the set comprising visual, audible, and tactile representations for indicating the microphone state.

49. The system of claim 1 wherein the telephony control comprises a voice mail button operable to generate a momentary signal to the application to access voice mail messages.

50. The system of claim 49 wherein the telephony control further comprises an indicator that uses at least one member of the set comprising visual, audible, and tactile representations for indicating the presence of a voice mail message.

51. The system of claim 1, wherein the component operably coupled to the telephony control comprises a hardware interface.

52. The system of claim 1, wherein the operating system further comprises a component for controlling an indicator for the telephony control.

53. The system of claim 52, wherein the indicator uses at least one member of the set comprising visual, audible, and tactile representations.

54. The system of claim 1 further comprising a keyboard, the keyboard comprising telephony controls including Talk, Speaker, Mute, Hold, Flash, Conference, Microphone, and Voicemail.

55. The system of claim 1 wherein the plurality of communications channels comprises a switched network, a mobile network, VOIP, and the internet.

56. The system of claim 1 wherein the communications controller is enabled to switch, during a call, the call from one communications channel to another communications channel.

57. The system of claim 1 wherein the communications controller is enabled to switch, during a call, the call from one device to another device.

58. The system of claim 1 wherein the communications controller is enabled to switch, during a call, the call from one mode to another mode, the modes comprising at least audio and video.

59. The system of claim 1 wherein the communications controller is enabled to convert text to speech and convert speech to text.

60. The system of claim 1 wherein the communications controller is enabled to convert a text message to a voicemail message and to convert a voicemail message to a text message.

61. In a computing environment, a method for providing telephony controls, the method comprising:
    providing a telephony control in a graphical user interface enabled to receive user input for a plurality of telephony tasks;
    receiving a control input for a telephony task through the telephony control;
    the telephony control forwarding the control input to an operating system, the operating system comprising control handling logic and indicator display logic and being coupled to the telephony control and to a telephony application;
    the operating system forwarding the control input to the telephony application;
    the telephony application performing a telephony task in response to the control input; and
    providing a communications controller enabling a user to connect to each of a plurality of communications channels, the controller enabled to receive data and output data on each of a plurality of devices, and the controller enabled to provide transitioning during telephone calls by applying real-time communication rules based at least in part on user-configurable settings and a current operating state.

62. The method of claim 61 wherein receiving a control input comprises pressing a talk button.

63. The method of claim 61 wherein receiving a control input comprises pressing a speaker button.

64. The method of claim 61 wherein receiving a control input comprises pressing a mute button.

65. The method of claim 61 wherein receiving a control input comprises pressing a hold button.

66. The method of claim 61 wherein receiving a control input comprises pressing a flash button.

67. The method of claim 61 wherein receiving a control input comprises pressing a voicemail button.

68. A computer-readable medium having computer-executable instructions for performing the method of claim 61.

* * * * *